E. W. BENDER.
CONTROLLING DEVICE FOR ELECTRIC MOTOR VEHICLES.
APPLICATION FILED JULY 13, 1910.
1,016,980.
Patented Feb. 13, 1912.
2 SHEETS—SHEET 1.
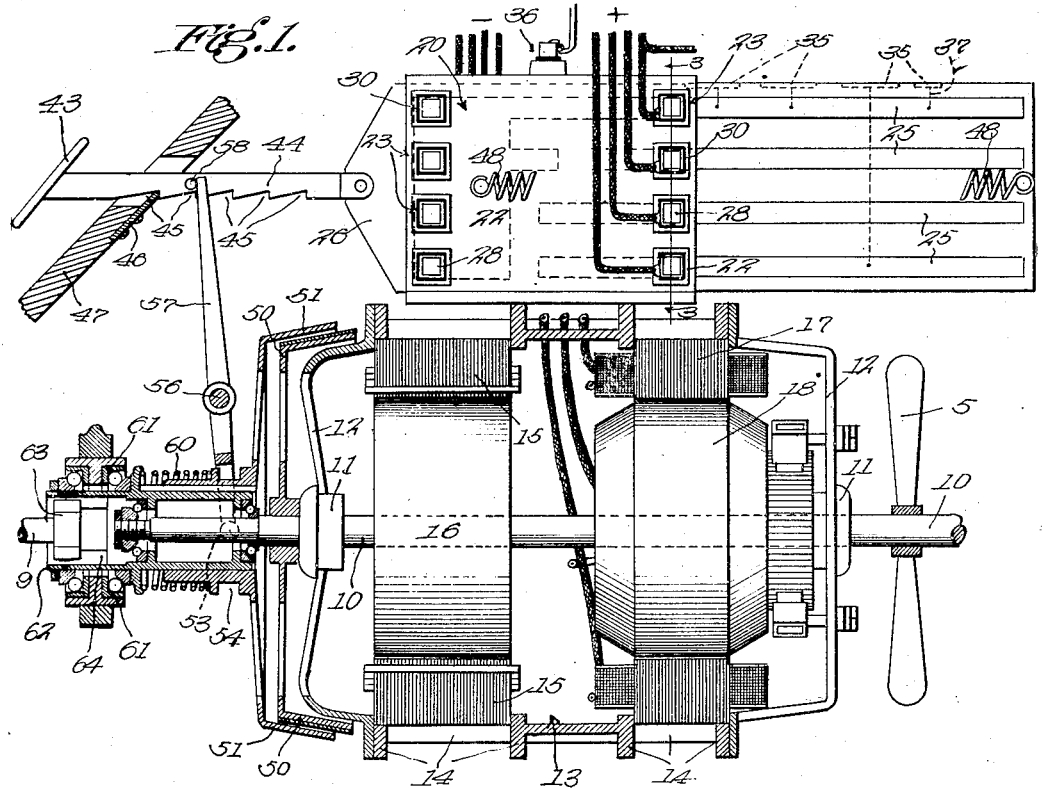
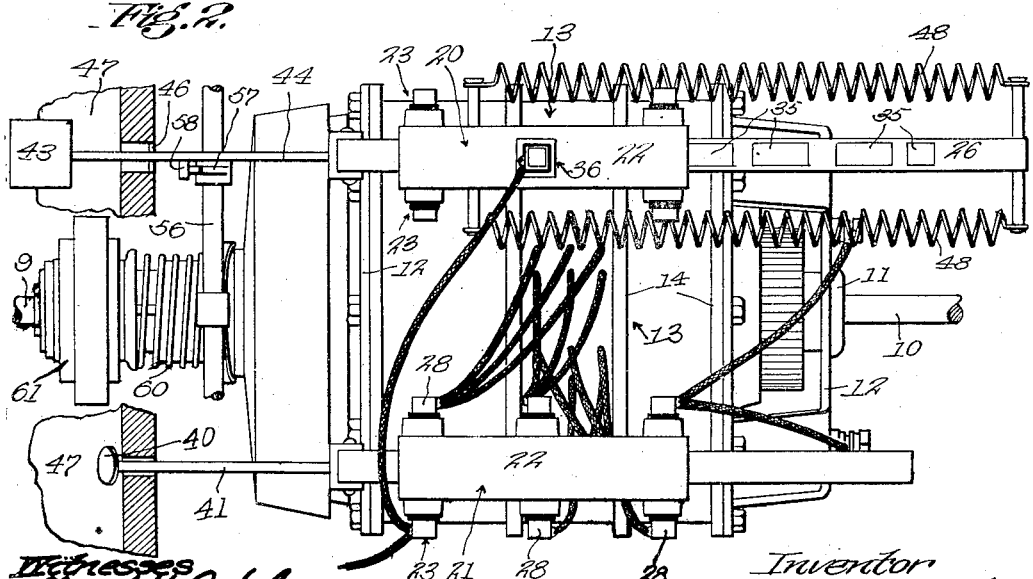
Witnesses
Edward H. Barkelow
Fred A. Willis
Inventor
Elmore W. Bender
by James T. Barkelow
his Attorney E. W. BENDER.
CONTROLLING DEVICE FOR ELECTRIC MOTOR VEHICLES.
APPLICATION FILED JULY 13, 1910.
1,016,980.
Patented Feb. 13, 1912.
2 SHEETS—SHEET 2.
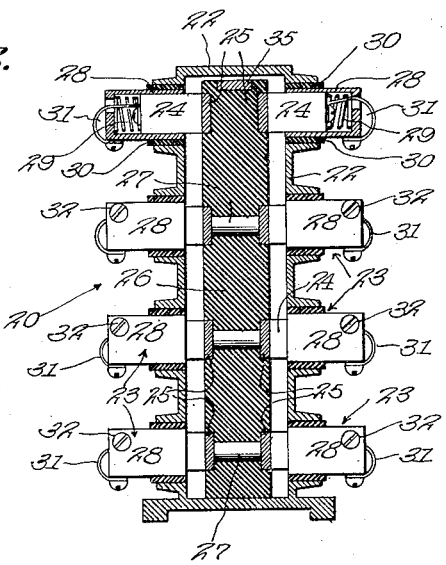
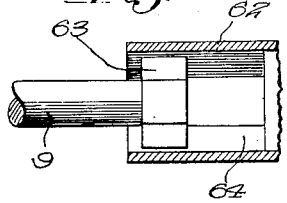
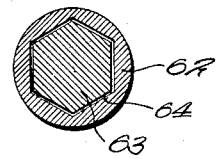
Witnesses
Elwood H. Bakelew
Fred A. Willis
Inventor
Elmore W. Bender
by James T. Bakelew
his Attorney.

UNITED STATES PATENT OFFICE.

ELMORE W. BENDER, OF LOS ANGELES, CALIFORNIA.

CONTROLLING DEVICE FOR ELECTRIC-MOTOR VEHICLES.

1,016,980.  Specification of Letters Patent.  Patented Feb. 13, 1912.

Application filed July 13, 1910. Serial No. 571,704.

*To all whom it may concern:*

Be it known that I, ELMORE W. BENDER, a citizen of the United States residing at Los Angeles, in the county of Los Angeles and State of California, have invented new and useful Improvements in Controlling Devices for Electric-Motor Vehicles, of which the following is a specification.

This invention relates to the mechanical features of a novel power plant and control for electric vehicles.

The vehicle of which this invention forms a part is provided with a rectifying plant for charging the storage batteries of the vehicle when only current of an unsuitable nature for charging is available. The storage batteries are arranged in a number of sections. A controller is used which will throw the sections into various combinations of connection, such as multiple, multiple series and series. By this means the current delivered to the motor controller may be varied in voltage to vary the speed and power of the motor.
A motor is provided for the propulsion of the vehicle. The rectifier includes this motor in combination as a generator. In its practical form the rectifier and motor take the form of a motor-generator for direct current and a motor for alternating current mounted in a single frame and on a single shaft between two bearings. The direct current generator is provided with four or more field poles, the terminals of the separate field pole windings being led directly to the motor controller. By means of the motor controller the motor-generator may be connected to operate in either direction as a series motor and also as a compound and shunt motor or dynamo. When it is desired to charge the batteries the generator is driven by an alternating current motor. Alternating current is now universally obtainable, so that with my arrangement the batteries may be charged at many more places than if they depended wholly upon an extraneous source of direct current. When charging the batteries the motor controller is thrown to its appropriate position to connect the motor-generator up as a shunt wound generator. The voltage supplied by the generator being suitable for charging the batteries, the batteries are easily and conveniently supplied with electric energy.
The motor generator may also be driven by the motor vehicle itself. When descending grades, the motor controller may be thrown to a position where the motor-generator is used as a generator and the power used to retard the vehicle is given back to the battery. There are many other features of advantage in my construction, but, as they do not enter into the invention as claimed herein, no further mention will be made of them.

The present invention consists in the mechanical features of the above outlined combination. The features comprise the combination of the mechanical structure of the motor-generator and rectifier, the mechanical construction of the controllers, and the features of combined action of the controllers and the motor. The particular utilities of these features will be set forth in the following specification.

In the accompanying drawings: Figure 1 is a sectional view showing my improved mechanism as installed in electric vehicles. Fig. 2 is a plan view of the same. Fig. 3 is an enlarged section taken on line 3—3 of Fig. 1 and showing the construction of the controllers. Figs. 4 and 5 are sectional details of the universal driving joint on the drive shaft.

In the drawings 10 designates a shaft which I shall hereinafter call the motor shaft. This shaft is mounted in two bearings 11 supported by spiders or other frames 12 from main frame 13 of the machine. Frame 13 is made with circumferential and longitudinal ribs 14, this construction allowing of maximum strength with minimum weight. In one end of frame 13 is held the laminated stator 15 of an induction motor. Rotor 16 of the induction motor is mounted on shaft 10. In the other end of the frame is held the laminated field 17 of a direct current motor or generator whose armature 18 is also mounted on shaft 10. This construction will be seen to embody a direct current motor, or a direct current generator, and an alternating current motor, all mounted on the same shaft. Controllers 20 and 21 are mounted on top of casing 13, one on each side of the center. Each of the controllers is comprised of a casing frame 20 carrying a number of brush members 23; and a moving element 26 carrying a number of contact strips 25. Element 26 is arranged inside of case 22 and its contact strips 25 are connected through the moving element, which is itself of insulating material, by stubs 27. The brush members 23 comprise square cases 28 carrying brushes or contact fingers 24 which are pressed into engagement with the contact strips 25 by springs 29. The brush members are completely insulated from casing 22 by means of insulating sleeves 30 and brushes 24 are connected by flat flexible connectors 31 to casings 28. Each of casings 28 is provided with a binding screw 32 to which are secured the different cables which lead to the batteries and to the motor controller and to the motor-generator itself.

In controller 20 the upper edge of movable member 26 is provided with contacts 35 which are engaged by a brush member 36. These contacts are connected by wires 37 to different ones of contact strips 25. Contact strips 25 are made of different lengths and shapes so that they engage with the various brush members at various times, connecting opposite brush members together in different combinations for different positions of the movable member 26. In controller 21 the member 26 is moved in any desired manner, such as through the medium of a button 40 mounted on the end of rod 41 attached to the member. This controller 21 is connected to control the different combinations of the motor generator connections. These connections are not changed as often as are the battery connections which are controlled by controller 20.

The operation of controller 20 is consequently arranged to be conveniently and quickly made. In the present showing I have illustrated the operation as by the foot, a foot pedal 43 mounted upon a bar 44 connected with member 26 affording the necessary medium of operation in one direction. Notches 45 on the under edge of bar 44 engaging with a piece 46 on dash 47 of the motor car afford means for holding the movable member of the controller in any desired position. The movement of the member toward the operator is effected through the medium of springs 48, a slight upward movement of the pedal disengaging the notches to allow the member to move back to position. In the present embodiment of my invention the "off" position of the controller is with the foot pedal and movable member in the positions shown. As the foot pedal is let back through its successive positions the different battery connections are made which supply increasing voltage to the motor.

Mounted at the end of the motor-generator rectifier unit and rigidly secured to shaft 10 is an inner cone clutch member 50. This clutch member may be faced with any material desired to engage with outer clutch member 51. Outer clutch member 51 is provided with a groove 54 which is engaged by pins or rollers 53 on the ends of a yoke mounted on shaft 56, this construction being of the usual character. An arm 57 extending upwardly from shaft 56 engages with a pin or other abutment on bar 44. The whole arrangement is such that the clutch will be held out of engagement when bar 44 is in the position shown and when no current is supplied to the motor through the controller. When the controller is operated to allow the passage of current, the clutch is also automatically thrown in. The precise instant at which the clutch is closed will depend on the general arrangement of the mechanism. It is preferable that the motor be allowed to start before the clutch is closed. This arrangement has been found to greatly reduce the amperage required to start the motor. When the motor is directly connected to the running gear of the vehicle it is necessary to start the motor with the vehicle load attached. The amperage required for the slow starting of such a load is a great deal higher than that required for the full power of the motor after it has attained speed. On the other hand, the unloaded motor requires but a small amount of current to start. After starting the clutch is gradually let in and the motor consequently gradually picks up the load. The large momentum of the rotating parts of my motor-generator rectifier unit materially aids the motor to pick up its load without requiring a large amount of current.

The clutch is closed by a spring 60. Immediately behind this spring is a bearing 61 carrying the outer socket member 62 of a universal shaft joint. Drive shaft 9 of the motor vehicle is made hexagon on its forward end as at 63 and enters the hexagon hole 64 in socket 62 comparatively loosely. Squared hole 64 is made in the sectional configuration shown in Fig. 4 so as to allow the angular movement of shaft 9. The shaft is also free to move longitudinally in the socket, so that the joint allows the drive shaft to move in all directions in relation to the socket and the power mechanism.

A fan 5 is provided on the motor shaft for cooling the motor-generator and the batteries which are located on the frame of the automobile behind the motor.

Having described my invention, I claim:

1. In combination, a direct current electro-mechanical machine adapted to act either as a motor or generator and an electric motor mechanically connected together, a controller for the direct current machine, a mechanical clutch connected to the direct current machine, and connective means whereby the clutch and controller are actuated simultaneously.

2. In combination, a direct current electro-mechanical machine adapted to act either as a motor or generator and an alternating current motor mechanically connected together, an electrical controller for the direct current machine, a mechanical clutch for the direct current machine, and mechanical connective means whereby the clutch and controller are operated together.

3. In an electric vehicle, a direct current electro-mechanical machine adapted to act either as a motor or as a generator, an alternating current motor mechanically connected to the said machine, a drive shaft, a clutch connection between the said machine and the drive shaft, a controller for the said machine, and connective means whereby the controller and clutch are operated simultaneously.

In witness that I claim the foregoing I have hereunto subscribed my name this 7th day of July 1910.

ELMORE W. BENDER.

Witnesses:
JAMES T. BARKELEW,
ELWOOD H. BARKELEW.